US011946020B2

(12) United States Patent
Ahirwal et al.

(10) Patent No.: US 11,946,020 B2
(45) **Date of Patent: *Apr. 2, 2024**

(54) FINE MIST HARD SURFACE CLEANING SPRAY

(71) Applicant: The Procter & Gamble Company, Cincinnati, OH (US)

(72) Inventors: Deepak Ahirwal, Brussels (BE); Paulus Antonius Augustinus Hoefte, Astene (BE); Cindy Jean, Houdeng-Aimeries (BE); Cedric Joseph Volont, Laken (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,397

(22) Filed: Sep. 12, 2022

(65) Prior Publication Data

US 2023/0016792 A1 Jan. 19, 2023

Related U.S. Application Data

(63) Continuation of application No. 16/413,629, filed on May 16, 2019, now Pat. No. 11,485,933.

(30) Foreign Application Priority Data

May 24, 2018 (EP) .................................... 18174025
Feb. 28, 2019 (EP) .................................... 19159867

(51) Int. Cl.

| | |
|---|---|
| ***C11D 1/00*** | (2006.01) |
| ***B08B 3/04*** | (2006.01) |
| ***C11D 1/72*** | (2006.01) |
| ***C11D 1/75*** | (2006.01) |
| ***C11D 1/825*** | (2006.01) |
| ***C11D 3/22*** | (2006.01) |
| ***C11D 3/37*** | (2006.01) |
| ***C11D 3/50*** | (2006.01) |
| ***C11D 11/00*** | (2006.01) |
| *C11D 17/00* | (2006.01) |

(52) U.S. Cl.

CPC .............. *C11D 1/825* (2013.01); *C11D 3/222* (2013.01); *C11D 3/50* (2013.01); *C11D 11/0023* (2013.01); *C11D 17/0043* (2013.01)

(58) Field of Classification Search

CPC .. C11D 1/00; C11D 1/665; C11D 1/72; C11D 1/75; C11D 3/222; C11D 3/37; C11D 3/50; C11D 11/0023; C11D 17/0043; B08B 3/04

See application file for complete search history.

(56) References Cited

U.S. PATENT DOCUMENTS

| | | | | |
|---|---|---|---|---|
| 2,608,320 | A | 8/1952 | Harrison, Jr. | |
| 4,842,165 | A | 6/1989 | Van | |
| 5,560,544 | A | 10/1996 | Merritt | |
| 5,707,952 | A | 1/1998 | Lambremont et al. | |
| 5,929,007 | A | 7/1999 | Feng | |
| 6,090,771 | A | 7/2000 | Burt | |
| 6,378,786 | B1 | 4/2002 | Beeston | |
| 6,403,546 | B1 | 6/2002 | Hernandez | |
| 6,498,131 | B1 | 12/2002 | Small | |
| 6,498,137 | B1 | 12/2002 | Schalitz et al. | |
| 7,795,197 | B2 | 9/2010 | Sawada | |
| 7,985,724 | B2 | 7/2011 | Inoue | |
| 8,193,138 | B2 | 6/2012 | Nekmard | |
| 9,206,381 | B2 | 12/2015 | Hodge | |
| 9,434,910 | B2 | 9/2016 | Gaudreault | |
| 9,546,346 | B2 | 1/2017 | Bjelopavlic | |
| 10,138,446 | B2 | 11/2018 | Boers | |
| 11,434,453 | B2 * | 9/2022 | Ahirwal | C11D 3/225 |
| 11,459,526 | B2 * | 10/2022 | Ahirwal | C11D 17/046 |
| 11,485,933 | B2 * | 11/2022 | Ahirwal | C11D 1/825 |
| 11,560,531 | B2 | 1/2023 | Ahirwal et al. | |
| 2002/0037817 | A1 | 3/2002 | Foley | |
| 2003/0119689 | A1 | 6/2003 | Hutton | |
| 2004/0138079 | A1 | 7/2004 | Becker et al. | |
| 2004/0157763 | A1 | 8/2004 | Foley | |
| 2007/0197464 | A1 | 8/2007 | Groenhof | |
| 2009/0143273 | A1 | 6/2009 | Cheung | |
| 2009/0197786 | A1 | 8/2009 | Perry | |
| 2009/0197793 | A1 | 8/2009 | Inoue et al. | |
| 2009/0288683 | A1 | 11/2009 | Cummings | |
| 2010/0255121 | A1 | 10/2010 | Perry | |

(Continued)

FOREIGN PATENT DOCUMENTS

| | | | |
|---|---|---|---|
| CN | 105802757 | A | 7/2016 |
| EP | 0606707 | A1 | 7/1994 |

(Continued)

OTHER PUBLICATIONS

All Office Actions, U.S. Appl. No. 16/413,626, Filed on May 16, 2019.
All Office Actions, U.S. Appl. No. 16/413,627, filed on May 16, 2019.
All Office Actions, U.S. Appl. No. 16/413,629, filed on May 16, 2019.
All Office Actions, U.S. Appl. No. 16/413,630, filed on May 16, 2019.
All Office Actions, U.S. Appl. No. 16/413,631, filed on May 16, 2019.
All Office Actions; U.S. Appl. No. 17/878,966, filed on Aug. 2, 2022.
Extended European Search Report; Application No. 18174025.9-1105; dated Dec. 19, 2018; 11 pages.

(Continued)

*Primary Examiner* — Brian P Mruk
(74) *Attorney, Agent, or Firm* — Carolyn S. Powell

(57) ABSTRACT

The need for a spray application of detersive compositions comprising perfume and low levels of surfactant, which provides more even coverage of the surface to be treated, while limiting nose and throat irritation is met by limiting the spray droplet size, such that the spray droplets have a particle size distribution such that the Dv10 is greater than about 40 microns.

17 Claims, No Drawings

(56) References Cited

U.S. PATENT DOCUMENTS

| | | | | |
|---|---|---|---|---|
| 2012/0187067 | A1 | 7/2012 | Maas | |
| 2013/0072419 | A1 | 3/2013 | Blattner | |
| 2013/0196893 | A1 | 8/2013 | Busby et al. | |
| 2013/0255729 | A1 | 10/2013 | Hodge | |
| 2014/0290694 | A1* | 10/2014 | Uchiyama .............. | C11D 3/222 510/495 |
| 2014/0349910 | A1 | 11/2014 | Zhong | |
| 2015/0259622 | A1 | 9/2015 | Bureiko | |
| 2016/0298059 | A1 | 10/2016 | Keenan | |
| 2017/0015944 | A1 | 1/2017 | Dkidak | |
| 2017/0136501 | A1 | 5/2017 | Rifkin | |
| 2017/0145357 | A1 | 5/2017 | Gonzales | |
| 2017/0164612 | A1 | 6/2017 | Ripberger | |
| 2017/0175036 | A1 | 6/2017 | Cermenati | |
| 2018/0007895 | A1 | 1/2018 | Karandikar et al. | |
| 2018/0100083 | A1 | 4/2018 | Gizaw | |
| 2018/0318858 | A1 | 11/2018 | Maas | |
| 2019/0359907 | A1 | 11/2019 | Bodet | |
| 2019/0359908 | A1 | 11/2019 | Ahirwal | |
| 2019/0359909 | A1 | 11/2019 | Ahirwal | |
| 2019/0359910 | A1 | 11/2019 | Ahirwal | |
| 2019/0359917 | A1 | 11/2019 | Ahirwal | |

FOREIGN PATENT DOCUMENTS

| | | | |
|---|---|---|---|
| EP | 0842606 | A1 | 5/1998 |
| EP | 0670883 | B2 | 6/2000 |
| EP | 2039747 | A1 | 3/2009 |
| EP | 2189517 | A1 | 5/2010 |
| EP | 3118301 | A1 | 1/2017 |
| JP | 2826097 | B2 | 10/1996 |
| JP | 3155071 | B2 | 10/2009 |
| JP | 2015145249 | A | 8/2015 |
| WO | 9317087 | A1 | 9/1993 |
| WO | 96/26263 | A1 | 8/1996 |
| WO | 9739089 | A1 | 10/1997 |
| WO | 03027218 | A1 | 4/2003 |
| WO | 2008129016 | A1 | 10/2008 |
| WO | 2011073062 | A1 | 6/2011 |
| WO | 2011151169 | A1 | 12/2011 |
| WO | 2012/138826 | A2 | 10/2012 |
| WO | 2013167438 | A1 | 11/2013 |
| WO | 2019072648 | A1 | 4/2019 |

OTHER PUBLICATIONS

Extended EP Search Report and Written Opinion for 19159867.1 dated Sep. 6, 2019, 11 pages.

Dow Chemical Company, “Safety Data Sheet for ECOSURF EH-9 Surfactant”, dated Jun. 15, 2018, pp. 1-10.

The Dow Chemical Company, “Safety Data Sheet for ECOSURF EH-6 Surfactant”, dated Dec. 19, 2019, pp. 1-12.

Unpublished U.S. Appl. No. 17/878,966, filed Aug. 2, 2022, to Deepak Ahirwal et. al.

All Office Actions; U.S. Appl. No. 18/081,824, filed on Dec. 15, 2022.

Unpublished U.S. Appl. No. 18/081,824, filed Dec. 15, 2022, to Deepak Ahirwal et. al.

“Dow SUrfactants—Alternatives to Alkyl Phenol Ethoxylate (APE, APEO) Surfactants”, Retrieved from the Internet: URL:http://msdssearch.dow.com/PublishedLiteratureDOWCOM/dh_093a/0901b8038093afdf.pdf?filepath=surfactants/pdfs/noreg/11902307.pdf&fromPage=GetDoc, Jan. 1, 2014, pp. 1-8.

* cited by examiner

FINE MIST HARD SURFACE CLEANING SPRAY

This application is a continuation of Ser. No. 16/413,629, filed on May 16, 2019, now U.S. Pat. No. 11,485,933.

FIELD OF THE INVENTION

The present invention relates to a detergent composition, in particular hard-surface cleaning composition, comprised in a spray container. The compositions of use for the spray container less dribbling of the hard surface cleaning composition on inclined hard surfaces, in addition to a more consistent fine mist spray, with less ultra-fine particles, while also increasing spray visibility on the treated surface.

BACKGROUND OF THE INVENTION

Detergent compositions for use on hard surfaces are formulated to provide multiple benefits, such as good cleaning and good shine. Where ease of use is desired, the detergent composition can be formulated for use with a spray applicator. Typically, the detergent composition has been formulated to provide tough cleaning. There remains a desire for more lighter duty, so-called maintenance cleaning, such as shortly after soiling has occurred. Such light-duty maintenance spray compositions typically comprise lower levels of detersive surfactants. Lower surfactant levels are desired since less surfactant means less residues on surface and hence improved shine. However, good cleaning remains essential. The efficacy of such light duty sprays has been limited by uneven deposition of the spray droplets onto the surface to be treated and by overspray.

Typical spray applicators used in hard surface cleaning applications result in a wide range of droplet sizes, from ultra-fine to large droplets. The result is less even distribution of the droplets over the surface, requiring greater scrubbing effort to remove stains, and more smearing of residues over the surface as cleaning efficacy is reduced. A more even distribution of droplets can be achieved by using a "mist" spray applicator which delivers the hard surface cleaning composition as finer droplets. However, such fine droplets result in more of the composition remaining suspended in are due to spray turbulence. As a result, such fines are more easily breathed in by the user, which can lead to more throat and nose irritation. Such throat and nose irritation is more pronounced for detersive compositions which comprise perfumes. In addition, since low surfactant compositions are less able to maintain the perfume within the droplets (particularly for the finer droplets), such irritation is more pronounced for fine mists of detersive compositions which comprise low levels of surfactant in addition to perfume.

Hence, a need remains for a spray application of detersive compositions comprising perfume and low levels of surfactant, which provides more even coverage of the surface to be treated, while limiting nose and throat irritation.

U.S. Pat. No. 5,929,007A relates to alkaline aqueous hard surface cleaning compositions which exhibit good cleaning efficacy against hardened dried or baked on greasy soil deposits, which are storage stable, and are not undesirably irritating to the skin or mucous tissues of the user. U.S. Pat. No. 9,206,381B2 relates to alkaline spray-on cleaners that can be delivered by pump or pressurized gas aerosol spray, for providing reduced choking mists, wherein the composition comprises a large anionic copolymer comprised of acrylamide and AMPS (acrylamide-sodium 2-acrylamido-2-methylpropane sulfonate), and/or polyethylene oxide polymers, a surfactant, and a source of alkalinity. WO03/027218 A1 relates to a hard-surface cleaning, optionally silicate-containing composition for removing cooked-, baked-, or burnt-on food soil from cookware and tableware, the composition comprising a smectite-type clay thickening agent and a hydrophobically modified polyacrylate polymer. The composition has shear thinning properties and can be used as pre-treatment prior to the dishwashing process. The composition provides excellent removal of polymerised grease from surfaces, particularly metal substrates.

SUMMARY OF THE INVENTION

The present invention relates to a distribution of spray droplets of a detersive composition, wherein the detersive composition comprises less than 5.0 wt % of a surfactant system and perfume, characterised in that the spray droplets have a particle size distribution such that the Dv10 is greater than 40 microns.

The present invention further relates to a method of treating a hard surface, wherein the method comprises a step of spraying the hard surface using a hard surface cleaning composition, wherein the hard surface cleaning composition comprises less than 5.0 wt % of a surfactant system and perfume, wherein the spray applicator comprises: a nozzle orifice having a diameter of from 0.15 mm to 0.40 mm, preferably from 0.20 to 0.38 mm, more preferably from 0.26 mm to 0.36 mm; and wherein the spray applicator comprises pressure regulation such that the spray is applied with a precompression of less than 650 kPa, preferably less than 600 kPa, more preferably less than 575 kPa.

DETAILED DESCRIPTION OF THE INVENTION

By limiting the spray droplet size, such that the spray droplets have a particle size distribution such that the Dv10 is greater than 40 microns, results in less throat and nose irritation, even though the detersive composition comprises perfume and low levels of surfactant.

Unless otherwise specified, by spray droplet size distribution, it is meant the volume weighted ("Dv") particle size distribution of the spray droplets. The most commonly used metrics when describing the volume weighted particle size distributions are the Dv-Values (Dv10, Dv4,3 & Dv90), and are well known in the art. Dv10 is the intercept for 10% of the cumulative volume, Dv4,3 is the volume mean diameter which is the intercept for 50% of the cumulative volume. Dv90 is the intercept for 90% of the cumulative volume. For example, the Dv10 is the diameter at which 10% of the sample's volume is comprised of particles with a diameter less than this value.

As defined herein, "essentially free of" a component means that no amount of that component is deliberately incorporated into the respective premix, or composition. Preferably, "essentially free of" a component means that no amount of that component is present in the respective premix, or composition. As defined herein, "stable" means that no visible phase separation is observed for a premix kept at 25° C. for a period of at least two weeks, or at least four weeks, or greater than a month or greater than four months. All percentages, ratios and proportions used herein are by weight percent of the composition, unless otherwise specified. All average values are calculated "by weight" of the composition, unless otherwise expressly indicated. All ratios are calculated as a weight/weight level, unless otherwise specified. All measurements are performed at 25° C. unless otherwise specified. +Unless otherwise noted, all component or composition levels are in reference to the active portion of that component or composition, and are exclusive of impurities, for example, residual solvents or by-products, which may be present in commercially available sources of such components or compositions.

The Detergent Composition

The detergent composition is a liquid composition. The composition is typically an aqueous composition and therefore preferably comprises water. The composition may comprise from 50% to 98%, even more preferably of from 75% to 97% and most preferably 80% to 97% by weight of water.

The pH of the composition according to the present invention may be greater than 7.0, preferably from 7.0 to 13, more preferably from 8.5 to 12.5, even more preferably from 9.5 to 12, most preferably 10.5 to 11.5, when measured on the neat composition, at 25° C.

The composition may comprise an acid or a base to adjust pH as appropriate.

A suitable acid for use herein is an organic and/or an inorganic acid. A preferred organic acid for use herein has a pKa of less than 6. A suitable organic acid is selected from the group consisting of citric acid, lactic acid, glycolic acid, succinic acid, glutaric acid and adipic acid and a mixture thereof. A suitable inorganic acid is selected from the group consisting hydrochloric acid, sulphuric acid, phosphoric acid and a mixture thereof. A typical level of such acid, when present, is of from 0.01% to 2.0%, from 0.1% to 1.5%, or from 0.5% to 1% by weight of the total composition.

A suitable base to be used herein is an organic and/or inorganic base. Suitable bases for use herein include alkali metal salts, caustic alkalis, such as sodium hydroxide and/or potassium hydroxide, and/or the alkali metal oxides such, as sodium and/or potassium oxide or mixtures thereof. A preferred base is a caustic alkali, more preferably sodium hydroxide and/or potassium hydroxide. Other suitable bases include ammonia.

The composition can comprise an alkali metal salt selected from carbonate salt, silicate salt, phosphate salt and sulphate salt.

Carbonate salts are particularly preferred, especially carbonate salts selected from the group consisting of: sodium carbonate, sodium bicarbonate, and mixtures thereof. Preferably the carbonate salt is sodium carbonate.

The composition may comprise from 0.01% to 2.0% by weight of the base, or from 0.02% to 1.0% or from 0.05% to 0.5% by weight.

Thickener:

The detergent composition can be a thickened composition. The detergent composition can comprise the thickener at a level of less than 0.5%, preferably 0.01% to 0.5%, more preferably from 0.05% to 0.2% by weight of the composition. Thickened detergent compositions also result in more effective cleaning of inclined surfaces since less of the composition runs off the inclined surface, particularly when the detergent composition is applied as a fine spray. With the addition of the polymer having a molecular weight of greater than 100,000 Daltons, less thickener is required in order to provide the desired cling to inclined surfaces, and more consistent spray droplet size with less ultra-fine droplets.

Suitable thickeners include thickeners selected from the group consisting of: hydrocolloid thickener, ASE (Alkali Swellable Emulsion) thickener, HASE (Hydrophobically modified alkali-swellable emulsion) thickener, HEUR (Hydrophobically-modified Ethylene oxide-based URethane) thickener, and mixtures thereof, though hydrocolloid thickeners and HASE thickeners are most preferred. Hydrocolloid thickeners are most preferred.

Hydrocolloid thickeners and their use in foods is described in: "Hydrocolloids as thickening and gelling agents in food: a critical review" (J Food Sci Technol (November-December 2010) 47(6):587-597). Hydrocolloids typically thicken through the nonspecific entanglement of conformationally disordered polymer chains. The thickening effect produced by the hydrocolloids depends on the type of hydrocolloid used, its concentration, the composition in which it is used and often also the pH of the composition.

Suitable hydrocolloid thickeners can be selected from the group consisting of: carbomers, polysaccharide thickeners, more preferably polysaccharide thickeners selected from the group consisting of: carboxymethylcellulose, ethyl cellulose, hydroxyethyl cellulose, hydroxypropyl cellulose, hydroxymethyl cellulose, succinoglycan, xanthan gum, gellan gum, guar gum, locust bean gum, tragacanth gum, and mixtures thereof, most preferably xanthan gum.

Carbomers are cross-linked acrylic acids, typically with a polyfunctional compound, and are used as suspending agents, including for pharmaceuticals. Suitable carbomers include carbomer® 940, supplied by Lubrizol.

The polysaccharide thickener can be selected from the group consisting of: carboxymethylcellulose, ethyl cellulose, hydroxyethyl cellulose, hydroxypropyl cellulose, hydroxymethyl cellulose, succinoglycan gum, xanthan gum, gellan gum, guar gum, locust bean gum, tragacanth gum, derivatives of the aforementioned, and mixtures thereof. Preferably, the polysaccharide thickener can be selected from the group consisting of: succinoglycan gum, xanthan gum, gellan gum, guar gum, locust bean gum, tragacanth gum, derivatives of the aforementioned, and mixtures thereof. More preferably, the polysaccharide thickener can be selected from the group consisting of: xanthan gum, gellan gum, guar gum, derivatives of the aforementioned, and mixtures thereof.

Particularly polysaccharide thickenrs for use herein are xanthan gum and derivatives thereof. Xanthan gum and derivatives thereof may be commercially available for instance from CP Kelco under the trade name Keltrol RD®, Kelzan S® or Kelzan T®. Other suitable xanthan gums are commercially available by Rhodia under the trade name Rhodopol T® and Rhodigel X747®. Succinoglycan gum for use herein is commercially available by Rhodia under the trade name Rheozan®.

HEUR polymeric structurants are water-soluble polymers, having hydrophobic end-groups, typically comprising blocks of ethylene glycol units, propylene glycol units, and mixtures thereof, in addition to urethane units. The HEUR polymeric structurants preferably has a backbone comprising one or more polyoxyalkylene segments greater than 10 oxyalkylene units in length. The HEUR polymeric structurant is preferably a hydrophobically modified polyurethane polyether comprising the reaction product of a dialkylamino alkanol with a multi-functional isocyanate, a polyether diol, and optionally a polyether triol. Preferably, the polyether diol has a weight average molecular weight between 2,000 and 12,000, preferably between 6,000 and 10,000 g/mol.

Preferred HEUR polymeric structurants can have the following structure:

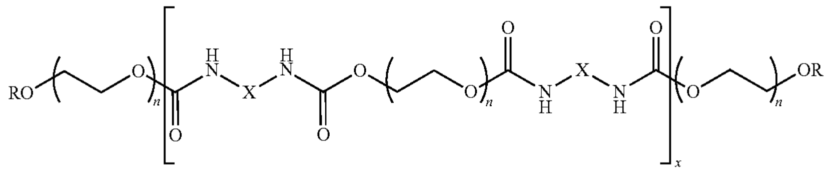

wherein:

R is an alkyl chain, preferably a C6-C24 alkyl chain, more preferably a C12-C18 alkyl chain, n is preferably from 25 to 400, preferably from 50 to 250, more preferably from 75 to 180, X can be any suitable linking group.

Suitable HEUR polymeric structurants can have a molecular weight of from 1,000 to 1,000,000, more preferably from 15,000 to 50,000 g/mol. An example of a suitable HEUR polymeric structurant is ACUSOL™ 880, sold by DOW.

It is believed that HEUR polymeric structurants thicken via an associative mechanism, wherein the hydrophobic parts of HEUR polymers build up associations with other hydrophobes present in the composition, such as the insoluble or weakly soluble ingredient.

HEUR polymers are typically synthesized from an alcohol, a diisocyanate and a polyethylene glycol.

Preferred HASE polymeric structurants can have the following structure:

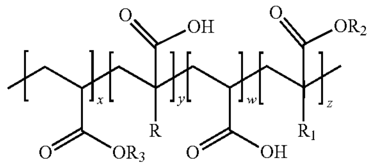

wherein:

R is preferably H or an alkyl group. When R is an alkyl group, R is preferably a C1-C6 alkyl group, more preferably a C1 to C2 alkyl group. R is preferably a C1 alkyl group.

$R_1$ is preferably H or an alkyl group. When $R_1$ is an alkyl group, R is preferably a C1-C6 alkyl group, more preferably a C1 to C2 alkyl group. $R_1$ is preferably a C1 alkyl group.

$R_2$ is any suitable hydrophobic group, such as a C4-C24 alkyl group, more preferably a C8-C20 alkyl group. $R_2$ can also be alkoxylated. Preferably, $R_2$ is ethoxylated, propoxylated, and combinations thereof. More preferably $R_2$ is ethoxylated. When alkoxylated, $R_2$ can be alkoxylated to a degree of from 1 to 60, preferably from 10 to 50.

$R_3$ is preferably H or an alkyl group. When $R_3$ is an alkyl group, $R_3$ is preferably a C1 -C6 alkyl group, more preferably a C1 to C3 alkyl group. $R_3$ is preferably a C2alkyl group.

The repeating units comprising R, $R_1$, $R_2$, and $R_3$ can be in any suitable order, or even randomly distributed through the polymer chain.

Suitable HASE polymeric structurants can have a molecular weight of from 50,000 to 500,000 g/mol, preferably from 80,000 to 400,000 g/mol, more preferably from 100,000 to 300,000 g/mol.

The ratio of x:y can be from 1:20 to 20:1, preferably from 1:10 to 10:1, more preferably from 1:5 to 5:1. The ratio of x:w can be from 1:20 to 20:1, preferably from 1:10 to 10:1, more preferably from 1:5 to 5:1. The ratio of x:z can be from 1:1 to 500:1, preferably from 2:1 to 250:1, more preferably from 25:1 to 75:1.

Examples of a suitable HASE polymeric structurants are ACUSOL™ 801S, ACUSOL™ 805S, ACUSOL™ 820, ACUSOL™ 823, sold by DOW.

HASE polymeric structurants are believed to structure by a combination of polyelectrolytic chain expansion and through association of the hydrophobe groups, present in the HASE polymeric structurant, with other hydrophobes present in the composition, such as the insoluble or weakly soluble ingredient.

HASE polymers are typically synthesized from an acid/acrylate copolymer backbone and include an ethoxylated hydrophobe. These products are also typically made through emulsion polymerization. Methods of making such HASE polymeric structurants are described in U.S. Pat. Nos. 4,514,552, 5,192,592, British Patent No. 870,994, and U.S. Pat. No. 7,217,443.

The composition may have a viscosity at shear rate 10 $s^{-1}$ of 1 mPa·s or greater, more preferably of from 1 to 20,000 mPa·s, or from 1.5 to 100 mPa·s, or from 1.5 to 30 mPa·s, or from 2 to 10 mPa·s, or from 2.5 to 5 mPa·s at 20° C. when measured with a DHR1 rheometer (TA instruments) using a 2° 40 mm diameter cone/plate geometry, with a shear rate ramp procedure from 1 to 1000 $s^{-1}$.

High Molecular Weight Polymer:

The composition can comprise a high molecular weight polymer. Suitable polymers have a weight average molecular weight of greater than 10,000 Da, or from 10,000 Da to 10,000,000 Da, preferably from 100,000 Da to 2,000,000 Da, most preferably from 500,000 Da to 1,250,000 Da.

The polymer can comprise monomers of: ethylene glycol, propylene glycol; and mixtures thereof, preferably ethylene glycol. The polymer can comprise the monomer at a level of greater than 20 mol %, preferably greater than 50 mol %, more preferably greater than 80 mol %. Most preferably the polymer is a homopolymer. Homopolymers of ethylene glycol (polyethyleneoxide) are particularly preferred.

The polymer is preferably essentially linear, more preferably linear. The linearity can be measured by counting the average number of end-groups per molecule and the number of repeating units, such as via NMR and vapor pressure osmometry. For instance, the end group concentration (e.g. the initiating or terminating species) and the repeating unit concentration ratio can be measured via NMR, to give the degree of polymerization before branching. The number average molecular weight, Mn before branching can be calculated by suitable means, including NMR. By comparing the actual Mn value from a direct measurement, such as by vapor pressure osmometry techniques, the degree of branching can be calculated.

Since the polymer has a high molecular weight, relatively low levels of the polymer are required in order to reduce nozzle spitting, improve spray visibility on the applied surface, and to improve spray particle size distribution. Hence, the polymer can present at a level of from 0.0001% to 0.1%, preferably from 0.0005% to 0.010%, more preferably from 0.001% to 0.005% by weight of the composition.

Preferably, the polymer is water-soluble, having a solubility of greater than 1.0 wt % in water at a temperature of 20° C.

Surfactant System:

The detergent composition provides effective cleaning and improved spray visibility when applied to a surface, even at low levels of surfactant. As such, the detergent composition can comprise the surfactant system at a level of less than 5%, preferably from 0.1% to 3.0%, more preferably from 0.5% to 1.5% by weight of the detergent composition.

Nonionic Surfactant:

The surfactant system preferably comprises nonionic surfactant, preferably selected from the group consisting of: alkoxylated nonionic surfactant, amine oxide surfactant, and mixtures thereof. More preferably, the nonionic surfactant comprises alkoxylated nonionic surfactant and amine oxide surfactant. Most preferably, the nonionic surfactant comprises branched alkoxylated nonionic surfactant and amine oxide surfactant.

The nonionic surfactant can be present at a level of from 0.05% to less than 5.0%, preferably from 0.1% to 3.0%, more preferably from 0.5% to 1.5% by weight of the detergent composition.

Alkoxylated Alcohol:

Suitable alkoxylated alcohols can be linear or branched, though branched alkoxylated alcohols are preferred since they further improve spray visibility on the treated hard surface, and results in faster cleaning kinetics.

Suitable branched alkoxylated alcohol can be selected from the group consisting of: C4-C10 alkyl branched alkoxylated alcohols, and mixtures thereof.

The branched alkoxylated alcohol can be derived from the alkoxylation of C4-C10 alkyl branched alcohols selected form the group consisting of: C4-C10 primary mono-alcohols having one or more C1-C4 branching groups.

The C4-C10 primary mono-alcohol can be selected from the group consisting of: methyl butanol, ethyl butanol, methyl pentanol, ethyl pentanol, methyl hexanol, ethyl hexanol, propyl hexanol, dimethyl hexanol, trimethyl hexanol, methyl heptanol, ethyl heptanol, propyl heptanol, dimethyl heptanol, trimethyl heptanol, methyl octanol, ethyl octanol, propyl octanol, butyl octanol, dimethyl octanol, trimethyl octanol, methyl nonanol, ethyl nonanol, propyl nonanol, butyl nonanol, dimethyl nonanol, trimethyl nonanol and mixtures thereof.

The C4-C10 primary mono-alcohol can be selected from the group consisting of: ethyl hexanol, propyl hexanol, ethyl heptanol, propyl heptanol, ethyl octanol, propyl octanol, butyl octanol, ethyl nonanol, propyl nonanol, butyl nonanol, and mixtures thereof.

Preferably the C4-C10 primary mono-alcohol is selected from the group consisting of: ethyl hexanol, propyl hexanol, ethyl heptanol, propyl heptanol, and mixtures thereof.

The C4-C10 primary mono-alcohol is most preferably ethyl hexanol.

In the branched alkoxylated alcohol, the one or more C1-C4 branching group can be substituted into the C4-C10 primary mono-alcohol at a C1 to C3 position, preferably at the C1 to C2 position, more preferably at the C2 position, as measured from the hydroxyl group of the starting alcohol.

The branched alkoxylated alcohol can comprise from 1 to 9, preferably from 2 to 7, more preferably from 4 to 6 ethoxylate units, and optionally from 1 to 9, preferably from 2 to 7, more preferably from 4 to 6 of propoxylate units.

The branched alkoxylated alcohol is preferably 2-ethyl hexan-1-ol ethoxylated to a degree of from 4 to 6, and propoxylated to a degree of from 4 to 6, more preferably, the alcohol is first propoxylated and then ethoxylated.

The detergent composition can comprise the branched alkoxylated alcohol at a level of from 0.01% to 5.0%, preferably from 0.1% to 1.0%, more preferably from 0.20% to 0.60% by weight of the composition. Higher levels of branched alkoxylated alcohol have been found to reduce of surface shine.

Suitable branched alkoxylated alcohols are, for instance Ecosurf® EH3, EH6, and EH9, commercially available from DOW, Lutensol XP and XL alkoxylated Guerbet alcohols, available from BASF.

Suitable linear alkoxylated nonionic surfactants include primary $C_6$-$C_{18}$ alcohol polyglycol ether i.e. ethoxylated alcohols having 6 to 16 carbon atoms in the alkyl moiety and 4 to 30 ethylene oxide (EO) units. When referred to for example $C_{9-14}$ it is meant average carbons in the alkyl chain and when referred to for example EO8 it is meant average ethylene oxide units in the head-group.

Suitable linear alkoxylated nonionic surfactants are according to the formula RO-(A)nH, wherein: R is a $C_6$ to $C_{18}$, preferably a $C_8$ to $C_{16}$, more preferably a $C_8$ to $C_{12}$ alkyl chain, or a $C_6$ to $C_{18}$ alkyl benzene chain; A is an ethoxy or propoxy or butoxy unit, and n is from 1 to 30, preferably from 1 to 15 and, more preferably from 4 to 12 even more preferably from 5 to 10.

Suitable linear ethoxylated nonionic surfactants for use herein are Dobanol® 91-2.5 (HLB=8.1; R is a mixture of $C_9$ and $C_{11}$ alkyl chains, n is 2.5), Dobanol® 91-10 (HLB=14.2 ; R is a mixture of $C_9$ to $C_{11}$ alkyl chains, n is 10), Dobanol® 91-12 (HLB=14.5; R is a mixture of $C_9$ to $C_{11}$ alkyl chains, n is 12), Greenbentine DE80 (HLB=13.8, 98 wt % C10 linear alkyl chain, n is 8), Marlipal 10-8 (HLB=13.8, R is a C10 linear alkyl chain, n is 8), Isalchem® 11-5 (R is a mixture of linear and branched C11 alkyl chain, n is 5), Isalchem® 11-21 (R is a $C_{11}$ branched alkyl chain, n is 21), Empilan® KBE21 (R is a mixture of $C_{12}$ and $C_{14}$ alkyl chains, n is 21) or mixtures thereof. Preferred herein are Dobanol® 91-5, Neodol® 11-5, Isalchem® 11-5, Isalchem® 11-21, Dobanol® 91-8, or Dobanol® 91-10, or Dobanol® 91-12, or mixtures thereof. These Dobanol®/Neodol® surfactants are commercially available from SHELL. These Lutensol® surfactants are commercially available from BASF and these Tergitol® surfactants are commercially available from Dow Chemicals.

Suitable chemical processes for preparing the linear alkoxylated nonionic surfactants for use herein include condensation of corresponding alcohols with alkylene oxide, in the desired proportions. Such processes are well known to the person skilled in the art and have been extensively described in the art, including the OXO process and various derivatives thereof. Suitable alkoxylated fatty alcohol nonionic surfactants, produced using the OXO process, have been marketed under the tradename NEODOL® by the Shell Chemical Company. Alternatively, suitable alkoxylated nonionic surfactants can be prepared by other processes such as the Ziegler process, in addition to derivatives of the OXO or Ziegler processes.

Preferably, said linear alkoxylated nonionic surfactant is a $C_{9-11}$ EO5 alkylethoxylate, $C_{12-14}$ EO5 alkylethoxylate, a $C_{11}$ EO5 alkylethoxylate, $C_{12-14}$ EO21 alkylethoxylate, or a $C_{9-11}$ EO8 alkylethoxylate or a mixture thereof. Most preferably, said alkoxylated nonionic surfactant is a $C_{11}$ EO5 alkylethoxylate or a $C_{9-11}$ EO8 alkylethoxylate or a mixture thereof.

When present, the detergent composition can comprise linear alkoxylated nonionic surfactant at a level of from 0.01% to 5.0%, preferably from 0.1% to 1.0%, more preferably from 0.20% to 0.60% by weight of the composition.

Amine Oxide Surfactant:

Amine oxide surfactants are highly desired since they are particularly effective at removing grease.

Suitable amine oxide are according to the formula: $R_1R_2R_3NO$ wherein each of $R_1$, $R_2$ and $R_3$ is independently a saturated or unsaturated, substituted or unsubstituted, linear or branched, hydrocarbon chain of from 1 to 30 carbon atoms. Preferred amine oxide surfactants to be used according to the present invention are amine oxides having the following formula: $R_1R_2R_3NO$ wherein $R_1$ is an hydrocarbon chain comprising from 1 to 30 carbon atoms, preferably from 6 to 20, more preferably from 8 to 16 and wherein $R_2$ and $R_3$ are independently saturated or unsaturated, substituted or unsubstituted, linear or branched hydrocarbon chains comprising from 1 to 4 carbon atoms, preferably from 1 to 3 carbon atoms, and more preferably are methyl groups. $R_1$ may be a saturated or unsaturated, substituted or unsubstituted, linear or branched, hydrocarbon chain.

Suitable amine oxides for use herein are for instance $C_{12}$-$C_{14}$ dimethyl amine oxide, commercially available from Albright & Wilson; $C_{12}$-$C_{14}$ amine oxides commercially available under the trade name Genaminox® LA, from Clariant; AROMOX® DMC from AKZO Nobel; and $C_{12-14}$ alkyldimethyl, N-Oxide or EMPIGEN® OB/EG from Huntsman.

The detergent composition can comprise amine oxide surfactant at a level of from 0.1 wt % to 1.5 wt %, preferably 0.15 wt % to 1.0 wt %, more preferably from 0.25 wt % to 0.75 wt %.

In addition, amine oxide surfactants are particularly effective at solubilizing perfumes, even in low surfactant compositions as described herein.

As such, when the hard surface cleaning compositions comprises amine oxide surfactant, the hard surface cleaning composition can comprise perfume at a level of greater than 0.05%, preferably from 0.05% to 1.0%, more preferably from 0.1% to 0.5% by weight of the composition, even when the surfactant system is present at the low levels described herein.

Further Nonionic Surfactant:

The surfactant system further can comprise further nonionic surfactant. The further nonionic surfactant can be selected from the group consisting of: alkyl polyglycosides, and mixtures thereof.

Alkyl polyglycosides are biodegradable nonionic surfactants which are well known in the art. Suitable alkyl polyglycosides can have the general formula $C_nH_{2n+1}O(C_6H_{10}O_5)_xH$ wherein n is preferably from 9 to 16, more preferably 11 to 14, and x is preferably from 1 to 2, more preferably 1.3 to 1.6. Such alkyl polyglycosides provide a good balance between anti-foam activity and detergency. Alkyl polyglycoside surfactants are commercially available in a large variety. An example of a very suitable alkyl poly glycoside product is Plantaren® APG 600 (supplied by BASF), which is essentially an aqueous dispersion of alkyl polyglycosides wherein n is about 13 and x is about 1.4.

When present, the detergent composition can comprise alkyl polyglycoside surfactant at a level of from 0.01% to 5.0%, preferably from 0.1% to 1.0%, more preferably from 0.20% to 0.60% by weight of the composition.

The nonionic surfactant is preferably a low molecular weight nonionic surfactant, having a molecular weight of less than 950 g/mol, more preferably less than 500 g/mol.

Anionic or Cationic Surfactant

The composition preferably comprises nonionic surfactant and low levels or no anionic surfactant. As such, the surfactant system can comprise anionic surfactant at a level of less than 0.3%, preferably less than 0.15% of the composition, more preferably the composition is free of anionic surfactant. Anionic surfactants have been found to reduce surface shine, especially when hard water ions are present, for instance, when rinsing the surface with tap water after the spray application.

The composition preferably does not comprise cationic surfactant since such surfactants typically result in less shine of the surfaces after treatment.

Organic Solvent

The composition can comprise an organic solvent. Preferred solvents include those selected from the group consisting of aminoalcohols, glycol ether solvents, and mixtures thereof. A blend of solvents comprising an aminoalcohol and a glycol ether solvent is particularly preferred. The surfactant system and aminoalcohol solvent are present at a weight ratio of from 2:1 to 1:10, preferably from 1.5:1 to 1:5, preferably from 1:1 to 1:3.

The composition may comprise organic solvent at a level of from 0.5 to 10%, or from 0.85 to 5.0%, or from 1.15 to 3.0%.

The aminoalcohols can be selected from the group consisting of: monoethanolamine (MEA), triethanolamine, monoisopropanolamine, and mixtures thereof, preferably the aminoalcohol is selected from the group consisting of: monoethanolamine, triethanolamine, and mixtures thereof, more preferably the aminoalcohol is a mixture of monoethanolamine and triethanolamine The aminoalcohol can be present at a level of from 0.5% to 5.0%, more preferably from 0.75% to 3.5%, most preferably from 0.9% to 2.0% by weight of the composition.

Preferably, the monoethanolamine and triethanolamine are present in a weight ratio of from 0.5:1 to 1:10, preferably from 1:1 to 1:6, more preferably from 1:2 to 1:4, in order to provide improved grease removal.

The detergent composition can comprise a glycol ether solvent. The glycol ether can be selected from Formula 1 or Formula 2.

$$R_1O(R_2O)_nR_3 \quad \text{Formula 1:}$$

wherein:

$R_1$ is a linear or branched $C_4$, $C_5$ or $C_6$ alkyl, a substituted or unsubstituted phenyl, preferably n-butyl. Benzyl is one of the substituted phenyls for use herein.

$R_2$ is ethyl or isopropyl, preferably isopropyl

R3 is hydrogen or methyl, preferably hydrogen n is 1, 2 or 3, preferably 1 or 2.

$$R_4O(R_5O)_mR_6 \quad \text{Formula 2:}$$

wherein:

$R_4$ is n-propyl or isopropyl, preferably n-propyl $R_5$ is isopropyl $R_6$ is hydrogen or methyl, preferably hydrogen m is 1, 2 or 3 preferably 1 or 2.

Preferred glycol ether solvents according to Formula 1 are ethyleneglycol n-butyl ether, diethyleneglycol n-butyl ether, triethyleneglycol n-butyl ether, propyleneglycol n-butyl ether, dipropyleneglycol n-butyl ether, tripropyleneglycol n-butyl ether, and mixtures thereof.

Most preferred glycol ethers according to Formula 1 are propyleneglycol n-butyl ether, dipropyleneglycol n-butyl ether, and mixtures thereof.

Preferred glycol ether solvents according to Formula 2 are propyleneglycol n-propyl ether, dipropyleneglycol n-propyl ether, and mixtures thereof.

Most preferred glycol ether solvents are propyleneglycol n-butyl ether, dipropyleneglycol n-butyl ether, and mixtures thereof, especially dipropyleneglycol n-butyl ether.

Suitable glycol ether solvents can be purchased from The Dow Chemical Company, more particularly from the E-series (ethylene glycol based) Glycol Ethers and the P-series (propylene glycol based) Glycol Ethers line-ups. Suitable glycol ether solvents include Butyl Carbitol, Hexyl Carbitol, Butyl Cellosolve, Hexyl Cellosolve, Butoxytriglycol, Dowanol Eph, Dowanol PnP, Dowanol DPnP, Dowanol PnB, Dowanol DPnB, Dowanol TPnB, Dowanol PPh, and mixtures thereof.

The glycol ether solvent can be present at a level of 0.05% to 2.0%, preferably from 0.1% to 1.0%, more preferably from 0.25% to 0.75% by weight of the composition. Higher levels of glycol ether solvent have been found to result in reduced surface shine for the treated surface.

The aminoalcohol and glycol ether solvent are present at a weight ratio of from 10:1 to 1:1, preferably 7:1 to 1:2, more preferably from 5:1 to 3:1.

Suitable additional solvents can be selected from the group consisting of: aromatic alcohols; alkoxylated aliphatic alcohols; aliphatic alcohols; $C_8$-$C_{14}$ alkyl and cycloalkyl hydrocarbons and halohydrocarbons; terpenes; and mixtures thereof.

Chelating Agents

The composition may comprise a chelating agent or mixtures thereof. Chelating agents can be incorporated in the compositions herein in amounts ranging from 0.0% to 10.0% by weight of the total composition, preferably 0.01% to 5.0%.

Suitable phosphonate chelating agents for use herein may include alkali metal ethane 1-hydroxy diphosphonates (HEDP), alkylene poly (alkylene phosphonate), as well as amino phosphonate compounds, including aminotri(methylene phosphonic acid) (ATMP), nitrilo trimethylene phosphonates (NTP), ethylene diamine tetra methylene phosphonates, and diethylene triamine penta methylene phosphonates (DTPMP). The phosphonate compounds may be present either in their acid form or as salts of different cations on some or all of their acid functionalities. Preferred phosphonate chelating agents to be used herein are diethylene triamine penta methylene phosphonate (DTPMP) and ethane 1-hydroxy diphosphonate (HEDP). Such phosphonate chelating agents are commercially available from Monsanto under the trade name DEQUEST®.

Polyfunctionally-substituted aromatic chelating agents may also be useful in the compositions herein. See U.S. Pat. No. 3,812,044, issued May 21, 1974, to Connor et al. Preferred compounds of this type in acid form are dihydroxydisulfobenzenes such as 1,2-dihydroxy-3,5-disulfobenzene.

A preferred biodegradable chelating agent for use herein is ethylene diamine N,N'-disuccinic acid, or alkali metal, or alkaline earth, ammonium or substitutes ammonium salts thereof or mixtures thereof. Ethylenediamine N,N'-disuccinic acids, especially the (S, S) isomer have been extensively described in U.S. Pat. No. 4, 704, 233, Nov. 3, 1987, to Hartman and Perkins. Ethylenediamine N,N'-disuccinic acids is, for instance, commercially available under the tradename ssEDDS® from Palmer Research Laboratories.

Suitable amino carboxylates for use herein include ethylene diamine tetra acetates, diethylene triamine pentaacetates, diethylene triamine pentaacetate (DTPA), N-hydroxyethylethylenediamine triacetates, nitrilotri-acetates, ethylenediamine tetrapropionates, triethylenetetraaminehexa-acetates, ethanol-diglycines, propylene diamine tetracetic acid (PDTA) and methyl glycine diacetic acid (MGDA), both in their acid form, or in their alkali metal, ammonium, and substituted ammonium salt forms. Particularly suitable amino carboxylates to be used herein are diethylene triamine penta acetic acid, propylene diamine tetracetic acid (PDTA) which is, for instance, commercially available from BASF under the trade name Trilon FS® and methyl glycine di-_acetic acid (MGDA). Further carboxylate chelating agents for use herein include salicylic acid, aspartic acid, glutamic acid, glycine, malonic acid or mixtures thereof.

Other Ingredients

The composition may further include any suitable ingredients such as builders, other polymers, preservative, hydrotropes, stabilisers, radical scavengers, soil suspenders, dispersant, silicones, fatty acid, branched fatty alcohol, and/or dye. The compositions of the present invention do not comprise any bleach.

Container:

The composition is packaged in a container comprising a spray applicator and a container-body. The container-body is typically made of plastic and comprises the detergent composition. The container body is preferably non-pressurized. That is, the container body does not contain any pressurized gas, with spray pressure being generated by the spray applicator via mechanical action, such as via a spray-trigger or electrical actuation. The spray applicator can be a spray dispenser, such as a trigger spray dispenser or pump spray dispenser. While the compositions herein may be packaged in manually or electrically operated spray dispensing containers, manually operated spray dispensing containers are preferred. Such manually operated spray applicators typically comprise a trigger, connected to a pump mechanism, wherein the pump mechanism is further connected to a dip-tube which extends into the container-body, the opposite end of the dip-tube being submersed in the liquid detergent composition.

The spray applicator allows to uniformly apply the detergent composition to a relatively large area of a surface to be cleaned. Such spray-type applicators are particularly suitable to clean inclined or vertical surfaces. Suitable spray-type dispensers to be used according to the present invention include manually operated trigger type dispensers sold for example by Specialty Packaging Products, Inc. or Continental Sprayers, Inc. These types of dispensers are disclosed, for instance, in U.S. Pat. Nos. 4,701,311, 4,646,973 and 4,538,745.

The spray applicator can comprise a nozzle orifice having a diameter of from 0.15 mm to 0.40 mm, preferably from 0.20 to 0.38 mm, more preferably from 0.26 mm to 0.36 mm. The spray applicator comprises pressure regulation such that the spray is applied with a precompression pressure of between 250 kPa and 650 kPa, preferably between 300 kPa and 600 kPa, more preferably between 350 kPa and 575 kPa. The combination of the nozzle orifice diameter and pre-compression pressure results in more uniform spray distribution. The combination of the desired orifice diameter and pre-compression pressure, with a composition comprising a branched alkoxylated alcohol results in improved visibility of the spray on the surface, while limiting or preventing nozzle clogging.

The lower limit of the pre-compression pressure can be achieved by providing a pre-compression valve arranged between the outlet channel, delivering the detergent composition from the pump mechanism of the spray applicator, to the nozzle comprising the orifice. The upper limit of the pre-compression pressure can be achieved through any suitable means, for instance, by providing a buffer chamber connected to the aforementioned outlet channel, wherein the buffer chamber comprises a spring-loaded piston for varying the useable volume of the buffer chamber.

A further advantage of providing the spray applicator with the aforementioned pre-compression pressure is that with each application (for instance, with each trigger pull), a more uniform spray application is achieved. When combined with a buffer chamber, the throughput is maintained at a constant rate over a longer duration for each application (such as each trigger pull). As a result, the spray applicator can deliver the detersive composition at a flow rate of from 0.1 ml/s to 4.5 ml/s, preferably 0.25 ml/s to 3.0 ml/s, most preferably from 0.8 ml/s to 2.2 ml/s. The lower flow rates lead to smaller droplet sizes, and less coalescence of the droplets during spraying. Since more uniform application is achieved, less dripping of the detergent composition on inclined surfaces is also achieved. Such spray applicators can provide a spray duration of from 0.3 s to 2.5 s, preferably from 0.5 s to 2.0 s, more preferably from 0.7 s to 1.25 s with each spray applicator activation. Long, even spraying leads to more uniform distribution of particle sizes, and less coalescence of droplets to form larger droplets. Also, such spray application results in less pressure variation during spraying and hence, more uniform droplet size and less over-spray.

Particularly preferred to be used herein are spray-type dispensers such as those sold under the Flairosol™ brand by AFA-dispensing, as described in patent application WO2017/074195 A.

The container-body can be a single-layer body. In preferred embodiments, the container-body can be a two or more layer delaminating bottle, also known as "bag-in-bottle" containers. Such container-bodies have an inner delaminating layer which collapses as product is expelled from the spray applicator. As such, little or no air is entrained into the container-body. The result is reduced product degradation due to oxidation, bacterial contamination, loss of volatiles (such as perfumes), and the like. In addition, the use of delaminating bottles enables spraying even when the spray head is below the container body, since the dip-tube remains submerged in the liquid detergent composition. This enables easier cleaning of hard to reach spaces, such as under sinks, and the like.

Typically, such bag-in-bottle containers comprise an outer bottle and an inner flexible bag. The outer bottle typically includes a resilient side wall portion. When dispensing via squeezing, pumping, and the like, product from the bag is forced through a dispensing passage (such as a dip-tube), as the inner product bag is collapsed under pressure. The inner bag preferably collapses while maintaining a passage for the product contained therein, to the opening, such that product is not trapped in the inner bag, as the inner bag collapses. Typically, this is achieved by connecting the inner bag to a resilient outer bottle with at least one interlock. An interlock is typically located at the bottom of the bottle, in order to avoid product entrapment, but also to hide the interlock and reduce its impact on the aesthetic form of the bottle.

Such bag-in-bottle containers are typically made via stretch blow-moulding of a preform. In order to blow-mould such preforms, the preform is typically heated such that the preform can be formed to the desired shape.

Method of Treating a Hard Surface:

The present invention includes a method of treating a hard surface, wherein the method comprises spraying the hard surface using a container as described herein, wherein the spray applicator further comprises: a nozzle orifice having a diameter of from 0.15 mm to 0.40 mm, preferably from 0.20 to 0.38 mm, more preferably from 0.26 mm to 0.36 mm; and wherein the spray applicator comprises pressure regulation such that the spray is applied with a precompression pressure of between 250 kPa and 650 kPa, preferably between 300 kPa and 600 kPa, more preferably between 350 kPa and 575 kPa. Such a combination of spray applicator and detergent composition results in a finer spray mist. In addition, a more consistent spray is achieved by using a precompression pressure as described above.

By using a finer, more consistent mist spray, a wider coverage can be achieved while maintaining a uniform spray distribution. As such, in the method of the present invention, the spray applicator preferably delivers a spray angle of greater than 30°, preferably from 35° to 105°, more preferably from 40 to 60°. However, a disadvantage of using a wider spray angle is that the resultant spray is less visible once it has been applied to the surface. As a result, the user is more inclined to repeat spraying over the same surface to ensure proper coverage. However, it has surprisingly been found that the addition of a high molecular weight polymer and/or a branched alkoxylated alcohol results in improved spray visibility on the treated surface, even when applied using a spray angle as described above.

In order to further improve spray uniformity and coverage, especially at the wider spray angles, the spray applicator can be designed to deliver the detersive composition at a flow rate of from 0.1 ml/s to 4.5 ml/s, preferably 0.25 ml/s to 3.0 ml/s, most preferably from 0.8 ml/s to 2.2 ml/s.

The spray can comprise a distribution of droplets of the hard surface cleaning composition, wherein the spray droplets have a particle size distribution such that the Dv10 is greater than 40 microns, preferably greater than 50 microns, more preferably greater than 60 microns. Smaller droplets have a greater tendency to be carried away by the spray turbulence, and hence are less likely to contact the surface to be treated. In addition, such fine droplets are more likely to be inhaled and cause nasal and throat irritation.

Nasal and throat irritation can be further reduced by limiting the particle size distribution such that the volume percent of spray particles in the range of from 10 microns to 100 microns is at most 25%, preferably at most 20%, more preferably at most 15%.

The spray droplets can have a particle size distribution such that the Dv90 is less than 325 microns, preferably less than 315 microns, more preferably less than 300 microns. Larger spray droplets are more likely to coalesce at the nozzle to cause nozzle-spitting and also not reach the surface to be treated when the hard surface is inclined, especially when the surface is a vertical surface such a wall.

A greater uniformity of droplets provides improved spray uniformity and greater visibility during spraying. Hence, reducing the fraction of fine droplets is preferably done without skewing the distribution of droplet sizes to larger particle sizes. As such, the spray droplets can have a particle size distribution such that the ratio of Dv90 to Dv10 is less than 7.0, preferably from 3.0 to less than 7.0, more preferably from 3.5 to less than 6.0, and most preferably from 4.0 to 5.0. Spray uniformity can also be improved limiting the shift in the mean particle size as the fraction of fine droplets is reduced. As such, the spray droplets can have a particle size distribution such that the ratio of Dv4,3 to Dv10 is less than 3.5, preferably from 2.1 to less than 3.5, more preferably from 2.4 to less than 3.3, and most preferably from 2.6 to less than 2.9.

For improved spray visibility and uniformity, in addition to less irritation, the distribution of spray droplets can have a particle size distribution such that the D4,3 is greater than 150, preferably from 180 microns to 350 microns, more preferably 200 to 300 microns.

METHODS pH Measurement:

The pH is measured on the neat composition, at 25° C., using a Sartarius PT-10P pH meter with gel-filled probe (such as the Toledo probe, part number 52 000 100), calibrated according to the instructions manual.

Pre-Compression Pressure:

As opposed to direct compression spray applicators, pre-compression spray applicators comprise at least one valve, in order to spray only when the desired precompression has been achieved.

In order to measure the precompression range for spray activation, the trigger (or other means of actuation) is removed and the spray applicator mounted to a horizontaly mounted motorized compression test stand, such that the force is applied via the transducer to the spray applicator piston, along the axis of the piston. Suitable horizontally mounted motorized compression test stands include the ESM303H Motorized Tension/Compression Test Stand, available from Mark-10. Using the compression stand, the spray applicator piston is displaced such that full displacement of the piston occurs in 1 second. For example, if the piston maximum displacement is 15 mm, the piston is displaced at a constant rate of 15 mm/s. The force profile during piston displacement is measured. The applied pre-compression pressure is then calculated as the force applied in Newtons, divided by the cross-sectional area of the piston in $m^2$, and is given in kPa·s (kilopascal seconds).

The minimum pre-compression pressure for spray activation is then calculated as the minimum force applied for spray activation, divided by the cross-sectional area of the spray applicator piston (expressed as kPa·s). This is also known as the "cracking pressure" or "unseating head pressure", the pressure at which the first indication of flow occurs.

Where the maximum spray pressure for spray application is also regulated (such as those sold under the Flairosol™ brand by AFA-dispensing, as described in patent application WO2017/074195 A), the maximum precompression pressure for spraying is measured using the same methodology, with the maximum precompression pressure for spraying being the maximum force that can be applied for spray activation, divided by the cross-sectional area of the spray applicator piston (expressed as KPa·s).

Spray Duration and Flow Rate:

The spray duration is measured by mounting the spray container to a test stand that actuates the trigger automatically with full trigger activation (i.e fully depressing the trigger) at a fixed speed which is equivalent to one full trigger activation in 1 second. The start of the spray duration is measured by any suitable means, such as the use of a sensor which senses the spray droplets exiting the applicator nozzle. The end of the spray duration is measured as the time at which the sensor measures spray cessation after the end of the trigger application. Suitable sensors include a light-based sensor such as a laser beam positioned to cross directly in front of the spray applicator nozzle, in combination with a detector to detect interruption of the laser beam by the spray droplets. The test is repeated 10 times and the results averaged to give the spray duration.

The average weight loss per full trigger application is measured as the weight loss over the 10 full trigger applications divided by 10. The flow rate (ml/sec) is calculated as the average volume loss per application (calculated from the average weight loss divided by the density of the fluid being sprayed) divided by the spray duration.

Particle Size Distribution:

The particle size distribution is measured on the spray using a Malvern Spraytec 97 RT Sizer. The sprayer is positioned so that the exit nozzle was 15 cm from the centre of the laser beam and 20 cm from a receiver. The height of the beam is aligned to be at the center of the exit nozzle. The sprayer is then actuated by hand a single time (full trigger depression in approximately one second) through the beam with data collection throughout the length of the spray. Data is then collected a further 2 times and converted to a volume average distribution. From this distribution, the D4,3 (volume mean diameter), Dv10 (the diameter where ten percent of the distribution by volume has a smaller particle size) and Dv90 (the diameter where ninety percent of the distribution by volume has a smaller particle size) are calculated (in microns).

% Visible Spray Area:

The spray container is mounted to a test stand that actuates the trigger automatically with full trigger activation (i.e fully depressing the trigger) at a fixed speed which is equivalent to one full trigger activation in between 0.3 and 0.4 seconds, followed by a period of full depression until after spraying has been completed. The spray container is mounted such that the centre line of the resultant spray pattern is horizontal and perpendicular to the target which consists of a "deep black super matt vinyl" film (supplied by Hexis material code: HX20890M) fixed to a foamboard backing, positioned vertically, at a distance of 20 cm from the spray nozzle exit.

After spraying, the spray target is (within 3 seconds) placed horizontally onto a Photosimile® 5000 with the camera placed in a vertical position. The image is then captured using the Photosimile® 5000 pack shot creator and analyzed using "Image J" (available from https//imagej.nih-.gov, Windows 64-bit Java version 1.8.0_112.

In order to calculate the total sprayed area, the color picture is first converted into a grey scale image then into a black and white image via a simple threshold conversion using a "0.30" threshold. The foam holes are manually filled, outliers removed (by excluding anything with a radius below 20 and threshold 50). The background is subtracted (using a "rolling=5" in Image J). The software then detects the number of pixels in this wet area and converts it to $cm^2$ (using a known conversion factor pixel to cm for the Photosimile® 5000). The software then used to draw a bounding box around the wet area to determine the total sprayed area.

In order to calculate the visible sprayed area, the same color picture is converted into a grey scale image then into a black and white image via a simple threshold conversion, but with a "80.255" threshold. Particles less than 0.01 cm are excluded and outliers are removed (by excluding anything with a radius below 1 and threshold 50. No background subtraction is done and the remaining pixels are selected and converted into a set of actual individual foam "blobs"

(terminology used in Image J") before conversion to in $cm^2$. A bounding box is used to capture all of these pixels to determine foam area.

The "% visible spray area" is then calculated as the "visible sprayed area/total sprayed area" expressed as a percentage.

Spray Angle:

The spray angle is calculated from the average radius of the total sprayed area, as calculated above, and the horizontal distance between the nozzle and the target (20 cm). I.e.:

spray cone angle (°)=2×[$\tan^{-1}$(average radius of the total sprayed area/horizontal distance between nozzle and target)]

Viscosity:

The viscosity is measured at 20° C. using an DHR-1 Advanced Rheometer from TA Instrument at a shear rate 0.1 $s^{-1}$ with a coned spindle of 40 mm with a cone angle 2° and a truncation of ±60 μm.

EXAMPLES

The following compositions were made by simple mixing before filling into a container comprising a spray applicator:

| | Ex A* wt % | Ex 2 wt % |
|---|---|---|
| Branched ethoxylated propoxylated alcohol[1] | 0.4 | 0.4 |
| C12-14 dimethylamine oxide[2] | 0.5 | 0.5 |
| Sodium carbonate | 0.1 | 0.1 |
| Monoethanolamine | 0.5 | 0.5 |
| Triethanolamine | 1.5 | 1.5 |
| Dipropyleneglycol n-butyl ether[3] | 0.4 | 0.4 |
| Polyethyleneoxide[4] | 0 | 0 |
| Xanthan gum[5] | 0 | 0.1 |
| Perfume | 0.15 | 0.15 |
| pH | 11.1 | 11.1 |
| Spray applicator | Current Mr Propre ™ sprayer[6] | Current Mr Propre ™ sprayer[6] |
| Dv10 (microns) | 37 | 53 |
| Dv90 (microns) | 213 | 344 |
| D4, 3 (microns) | 112 | 187 |
| Ratio of Dv90 to Dv10 | 5.8 | 6.5 |
| Ratio of D4, 3 to Dv10 | 3.0 | 3.5 |
| volume % of particles from 10 microns to 100 microns | 54 | 29 |

*Comparative
[1]Ecosurf EH6 commercially available from Dow
[2]supplied by Huntsman
[3]DOWANOL ™ DPnB, supplied by DOW
[4]PolyOx ™ molecular weight of 1,000,000 g/mol, supplied by DOW
[5]Keltrol RD, supplied by CP Kelco
[6]Current market Mr Propre ™ sprayer available from Belgian supermarkets.

The following compositions were made by simple mixing before filling into a container comprising a spray applicator:

| | Ex B* wt % | Ex 3 wt % |
|---|---|---|
| Branched ethoxylated propoxylated alcohol[1] | 0.4 | 0.4 |
| C12-14 dimethylamine oxide[2] | 0.5 | 0.5 |
| Sodium carbonate | 0.1 | 0.1 |
| Monoethanolamine | 0.5 | 0.5 |
| Triethanolamine | 1.5 | 1.5 |
| Dipropyleneglycol n-butyl ether[3] | 0.4 | 0.4 |
| Polyethyleneoxide[4] | 0 | 0 |
| Xanthan gum[5] | 0 | 0.1 |
| Perfume | 0.15 | 0.15 |
| pH | 11.1 | 11.1 |
| Spray applicator | Flairasol[7] | Flairasol[7] |
| Dv10 (microns) | 34 | 64 |
| Dv90 (microns) | 166 | 317 |
| D4, 3 (microns) | 94 | 181 |
| Ratio of Dv90 to Dv10 | 4.8 | 4.9 |
| Ratio of D4, 3 to Dv10 | 2.7 | 2.8 |
| volume % of particles from 10 microns to 100 microns | 62 | 25 |

-continued

[7]spray applicator according to WO2017074195

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A distribution of spray droplets of a hard surface cleaning composition, wherein the hard surface cleaning composition comprises less than about 5.0 wt % of a surfactant system and perfume, wherein the composition does not comprise a bleach, characterised in that the spray droplets have a particle size distribution such that the Dv10 is greater than about 40 microns wherein the particle size distribution is such that a volume percent of spray droplets having a diameter from 10 microns to 100 microns is greater than 0% and less than or equal to 25%.

2. The distribution of spray droplets according to claim 1, wherein the spray droplets have a particle size distribution such that the Dv10 is greater than about 50 microns.

3. The distribution of spray droplets according to claim 1, wherein the spray droplets have a particle size distribution such that the volume percent of particles in the range of from about 10 microns to about 100 microns is at most about 25%.

4. The distribution of spray droplets according to claim 1, wherein the spray droplets have a particle size distribution such that the ratio of Dv90 to Dv10 is less than about 7.0.

5. The distribution of spray droplets according to claim 1, wherein the spray droplets have a particle size distribution such that the ratio of Dv4,3 to Dv10 less than about 3.5.

6. The distribution of spray droplets according to claim 1, wherein the hard surface cleaning composition comprises the surfactant system at a level of from about 0.1% to about 3.0% by weight of the detergent composition.

7. The distribution of spray droplets according to claim 1, wherein the surfactant system comprises nonionic surfactant, selected from the group consisting of: alkoxylated nonionic surfactant, amine oxide surfactant, and mixtures thereof.

8. The distribution of spray droplets according to claim 1, wherein the hard surface cleaning composition comprises perfume at a level of greater than about 0.05% by weight of the composition.

9. The distribution of spray droplets according to claim 8, wherein the perfume comprises volatile organic constituents (VOC's) at a level of less than about 20% by weight of the perfume.

10. The distribution of spray droplets according to claim 1, wherein the hard surface cleaning composition comprises a thickener.

11. The distribution of spray droplets according to claim 10, wherein the thickener is selected from the group consisting of: hydrocolloid thickener, Alkali Swellable Emulsion (ASE) thickener, Hydrophobically-modified Alkali Swellable Emulsion (HASE) thickener, Hydrophobically-modified Ethylene oxide-based Urethane (HEUR) thickener, and mixtures thereof.

12. The distribution of spray droplets according to claim 11, wherein the hydrocolloid thickener selected from the group consisting of: cross-linked acrylic acid, starch, xanthan gum, galactomannans, gum arabic, gum karaya, gum tragacanth and carboxymethyl cellulose and mixtures thereof.

13. The distribution of spray droplets according to claim 10, wherein the thickener is present at a level of less than about 0.5% by weight of the composition.

14. The distribution of spray droplets according to claim 1, wherein the hard surface cleaning composition further comprises a polymer having a molecular weight of greater than about 10,000 Daltons.

15. The distribution of spray droplets according to claim 14, wherein the polymer is present at a level of from about 0.000001% to about 2% by weight of the composition.

16. The distribution of spray droplets according to claim 1, wherein the hard surface cleaning composition has a pH of greater than about 7.0, when measured on the neat composition, at about 25° C.

17. A method of treating a hard surface, wherein the method comprises a step of spraying the hard surface with a plurality of spray droplets of a detersive composition using a hard surface cleaning composition, wherein the hard surface cleaning composition comprises less than about 5.0 wt % of a surfactant system and perfume, wherein the spray applicator comprising:

(a) a nozzle orifice having a diameter of from about 0.15 mm to about 0.40 mm; and (b) wherein the spray applicator comprises pressure regulation such that the spray is applied with a precompression of less than about 650 kPa (c) wherein the spray droplets have a particle size distribution such that a volume percent of spray droplets having a diameter from 10 microns to 100 microns is greater than 0% and less than or equal to 25%.

* * * * *